D. B. CARSE.
ADVERTISING DEVICE.
APPLICATION FILED OCT. 11, 1919.
1,364,916.
Patented Jan. 11, 1921.
2 SHEETS—SHEET 1.
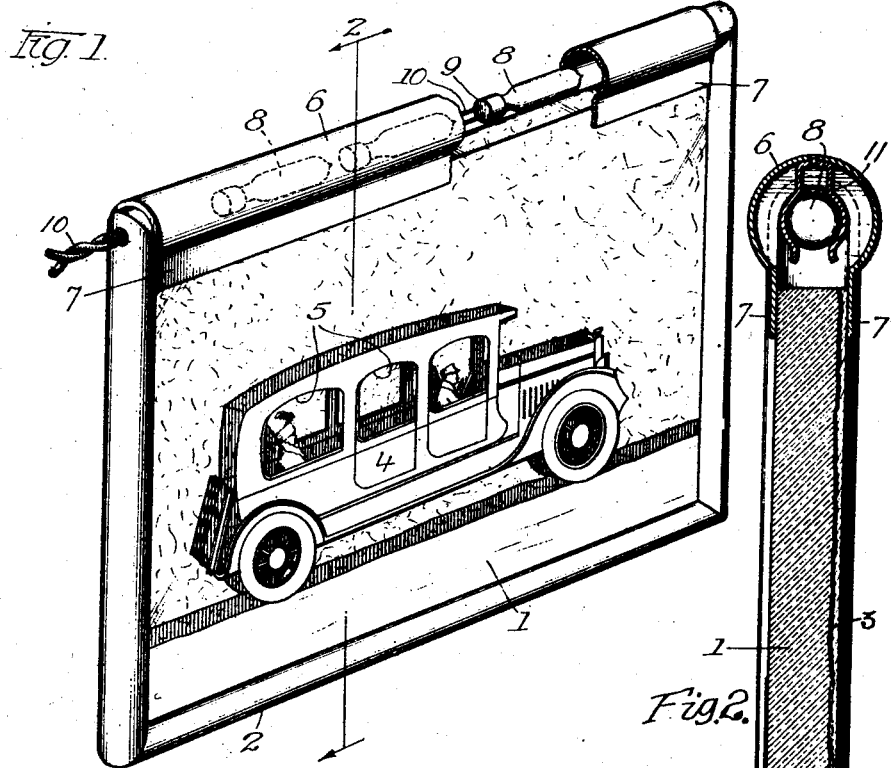
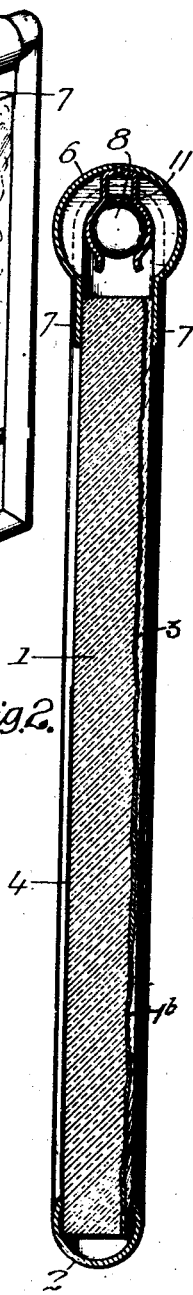
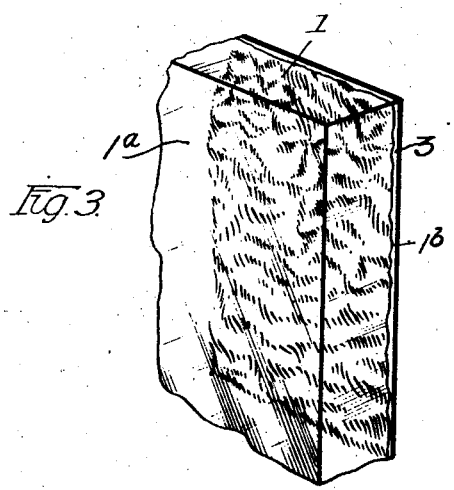
Inventor
David B. Carse D. B. CARSE.
ADVERTISING DEVICE.
APPLICATION FILED OCT. 11, 1919.
1,364,916.
Patented Jan. 11, 1921.
2 SHEETS—SHEET 2.
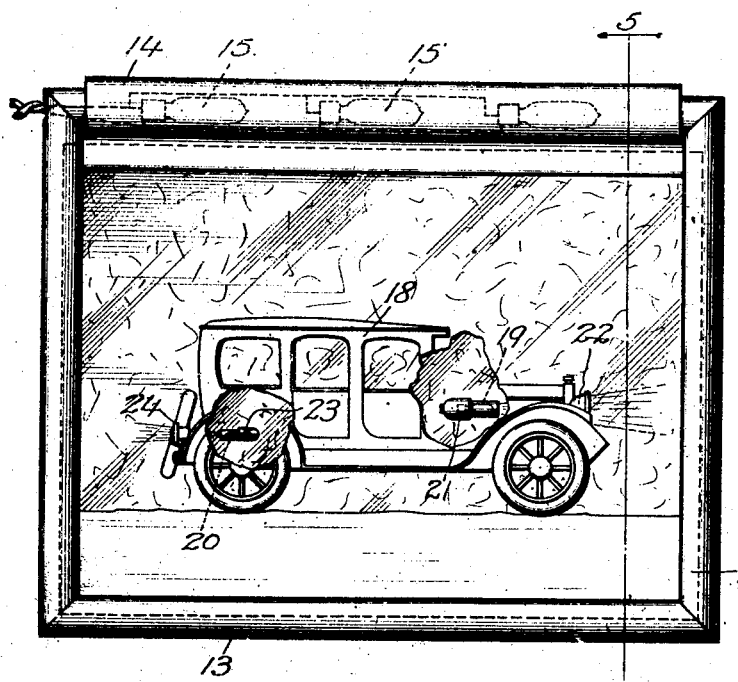
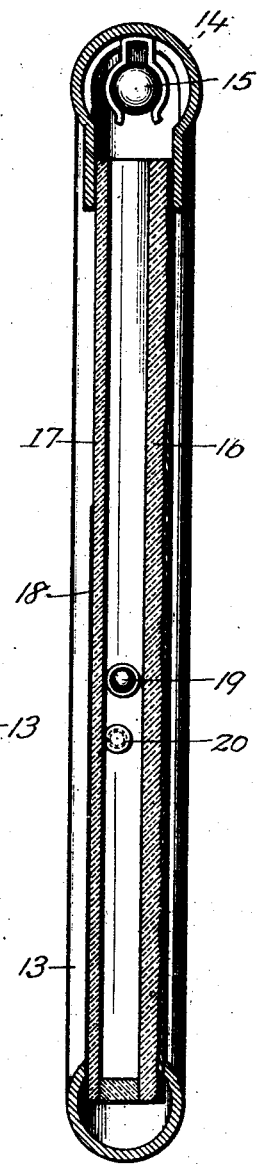
Inventor
David B. Carse

UNITED STATES PATENT OFFICE.

DAVID B. CARSE, OF SHARON, CONNECTICUT.

ADVERTISING DEVICE.

1,364,916.  Specification of Letters Patent.  Patented Jan. 11, 1921.

Application filed October 11, 1919. Serial No. 329,958.

*To all whom it may concern:*

Be it known that I, DAVID B. CARSE, a citizen of the United States, and a resident of Sharon, in the county of Litchfield and State of Connecticut, have invented certain new and useful Improvements in Advertising Devices, of which the following is a specification.

This invention relates to improvements in advertising devices, and more particularly to a structure in which is employed a novel arrangement of light reflecting and transmitting mediums which, with the aid of natural and artificial light, produces certain illusions and effects calculated to attract the attention of observers.

Among the objects of the invention is to provide a novel device that can be utilized for advertising and display purposes, and having as its principal feature the representation of a figure or article to be displayed or advertised so placed with respect to a reflecting surface as to produce an image of the figure in such a manner as to give the effect of the article in perspective, and further, by a novel application of artificial light to simulate the interior illumination of the figure thus appearing in perspective. By the use of reflecting material at the face or front of the object it is shown prominently as compared to the background, the surface reflecting the daylight or artificial light.

The desired effects and results referred to, together with others, will hereinafter be fully described in connection with the accompanying drawings, wherein—

Figure 1 is a view in perspective of the device in the form of a framed panel, and showing the features of construction and the effects obtained, Fig. 2 is a view in vertical section taken on line 2—2 of Fig. 1, Fig. 3 is an enlarged detail view showing the structure of a glass panel employed as the light transmitting and reflecting medium, Fig. 4 is a front view of a modified form of the device with portions cut away to show the structure, and Fig. 5 is a view in vertical section taken on line 5—5, of Fig. 4.

Referring to the drawings, a device embodying my invention is illustrated and will be clearly understood from the following: The device comprises in general the panel 1 of comparatively thick glass or other transparent material, said panel being preferably mounted in a frame 2 of any suitable construction and herein shown as made up of tubular beads which surround the edges of the glass panel.

Referring more in detail to the structure of the panel, the same is, as hereinbefore indicated, preferably of thick glass of the kind ordinarily designated as cathedral glass. The front face 1ª of the panel or sheet of glass has the ordinary smooth finish and its opposite or rear face 1ᵇ is roughened by a process in the manufacture of glass whereby an irregular finished surface, which may be termed "pebbled," is obtained. To this roughened surface is applied a coating 3 of silver such as is ordinarily used in the manufacture of mirrors, and in this manner numerous reflecting surfaces or mediums are produced which have much the appearance indicated in Fig. 3. A coating of moistureproof paint or the like may be applied to the rear surface of the panel as a protection to the coating 3 of silver which is applied to the roughened surface of the glass. The purpose of this particular form of reflecting surface will be understood in connection with the description of the function of the device.

Applied to the outer or smooth surface 1ª of the panel is painted or otherwise applied the figure or representation 4 of an object or article which is to be advertised or otherwise displayed. For the purpose of this invention I have used a figure of a motor vehicle of the inclosed or limousine type, as a suitable example of the type of article which my device is particularly suited to display, it being noted in this connection that any structure which may be inclosed and provided with openings may be painted, formed or otherwise applied to the panel and the effects hereinafter set forth will be obtained. The representation of a motor vehicle is herein shown as supported upon the ground, which may represent a road or other surface, although if desired, other objects or natural effects may be represented on the surface of the glass or in connection with the panel, such as a series of lamps connected with a "flasher" to give an effect of the vehicle in motion. The figure is preferably painted or otherwise applied in such manner that the windows 5 in the body of the opaque figure through which is visible the image reflected in the mirrored surface immediately behind, which, in the representation employed, would be the inner surface of the other wall of the vehicle body. The illusion of perspective may be further promoted by carrying out the details of the object upon the reverse side of the painted figure, which will obviously appear in the reflected image.

Extending along the upper edge of the panel and forming a portion of the frame 2 is a cylindric-shaped casing 6 which is slightly larger than the remaining portion of the frame and is provided with downwardly extending flanges 7, 7 which embrace the upper margin or edge of the glass panel, the surface of the edge being exposed to the interior of the casing. Within the casing 6 are mounted a suitable number of incandescent lamps 8 together with the lamp holders 9 and conductors 10, said conductors 10 being provided with suitable connection with a source of electric current. Brackets 11 are mounted within the casing in any desirable manner and act to hold the incandescent bulbs as shown in Fig. 2.

The manner in which the desired effects are obtained will be understood from the following: As is clearly shown in Fig. 1, the figure 4 on the outer surface of the glass panel will be reproduced on the reflecting surface in the form of an image of the figure itself. This image, if observed from any position other than directly in front of the figure, will give the appearance of the motor vehicle in perspective, that is, the vehicle will appear to have dimensions in other planes, for instance, the width of the vehicle will be visible, the interior of the vehicle will appear to have depth, and the wheels will appear four in number. In addition to this illusion, the presence of the electric incandescent lamps produce a further effect which will now be described. The lighted lamps being disposed along the upper edge of the glass panel and substantially in the plane of said panel will, when lighted, throw their rays directly downward and through the exposed edge of the glass. By reason of the roughened surface and the coating of silver thereon the reflecting surface thus formed is in fact composed of a multitude of small reflecting surfaces, each surface being in a different plane. As a result, the rays of light from the incandescent lamps 8 will strike the multitude of small reflecting surfaces in their passage through the body of the panel and by reason of the correspondingly large number of angles of incidence, such rays of light will be transmitted or diffused throughout the body of the glass panel and will not be reflected from the panel into space as would occur in the case of an ordinary smooth mirrored surface. The result produced, therefore, is that of the light rays being transmitted through the panel without being visible until they reach the area of the figure, where the rays of light become visible to the eye in the form of a diffused light which produces the effect of illumination within the interior of the vehicle body. This illuminating effect is emphasized by the contrast with the surrounding area or background which, by reason of the peculiar form of the reflecting surface, reflects little, if no light, and therefore is comparatively devoid of illuminating effects.

A further feature of my invention, and herein illustrated as a modification of the form heretofore described and illustrated in Figs. 1, 2 and 3 of the drawings, comprises a frame 13, a casing 14 with inclosed lamps 15, and remaining parts constructed in identically the same manner as heretofore described. In my modified form, instead of providing a single sheet of glass or other light transmitting material having the figure applied directly thereto, I employ a sheet or panel of glass 16 similar in every respect to the panel 1 heretofore described, said panel 16 constituting the rear portion of the frame. Spaced from and in parallel relation to the panel 16 is a separate panel 17, preferably of transparent material, said panel having applied thereto in any desired manner the opaque figure or representation of the motor vehicle heretofore described, although the figure itself and the surrounding objects, cut from sheets of opaque material with their natural outlines and openings, may constitute the spaced panel 17. Within the space between the panel 16 and the panel 17 are mounted incandescent lamps 19 and 20. As clearly illustrated in Fig. 4, the incandescent lamp 19 is surrounded by a suitable reflector 21 so arranged as to direct the rays in a lateral direction and in alinement with the head lights 22 of the figure 18. In a similar manner the incandescent lamp 20 is mounted between the panels 16 and 17 and adjacent to the rear part of the figure 18, said lamp being surrounded by a reflector 23 adapted to concentrate the rays thrown in a rearward direction and in alinement with the rear or tail lamp 24 represented as part of the figure of the motor vehicle. This lamp is preferably red in order that the rays may be of the same color to represent the red lamp that is ordinarily used at the rear of a motor vehicle. Any suitable form of brackets or supports may be employed for holding the lamps and reflectors in position.

Summarizing, the combination of novel effects obtained by my device, it is to be observed that in either form of the device the illusion of perspective is obtainable, either by sunlight or by the artificial light of the incandescent lamps associated with the device, hence this effect is present either by day or night. The effect of interior illumination is observable either by day or night, although it is obviously more pronounced under conditions of somewhat darkened surroundings. In the modification, in which the structure adopted is primarily for the purpose of providing a space for the additional lamps, it is possible to secure the illusion of rays of concentrated light and the movement of the wheels and vehicle, thus extending the number of natural effects reproduced, and hence increase the attractive qualities of the device.

While I have described and illustrated a particular form of the device, it is manifest that the device will admit of considerable modification without departing from the spirit of the invention, and therefore I do not wish to be limited other than by the scope of the appended claims.

It is clear that the combined effect of all of of the various reflecting and light transmitting mediums together with the source of concentrated rays produces a very natural and effective display of the figure represented on the panel, such an arrangement being particularly attractive to observers and calculated to attract their attention to the article displayed, and hence my invention is especially adapted for advertising purposes and for otherwise displaying articles to the public.

I claim as my invention:

1. In a device of the character described, the combination of a panel having light reflecting and diffusing surface, an opaque figure spaced from the surface of said light reflecting material, said figure in combination with its image in said reflecting surface producing the illusion of the figure in perspective.

2. In a device of the character described, the combination of a panel having light reflecting surface, an opaque figure spaced from said reflecting surface, said figure, together with its image, appearing in said light reflecting surface producing the illusion of the object in perspective.

3. In a device of the character described, the combination of a panel having a light reflecting surface, an opaque figure in the representation of a structure having openings therein spaced from said light reflecting surface, the image of the figure in said reflecting surface producing the illusion of the structure in perspective, a source of artificial light located in a position to be invisible, its rays being transmitted between said figure and its image to produce the effect of illumination within the structure.

4. In a device of the character described, the combination of a panel having light reflecting surface comprising a multitude of small reflecting surfaces disposed at various angles to the plane of said panel, and an opaque figure in the representation of a habitable structure with openings thereon, spaced from said light reflecting surface, said figure with its image in said reflecting surface producing the illusion of perspective within and without the structure.

5. In a device of the character described, the combination of a panel of light transmitting material having a light reflecting surface, comprising a multitude of small reflecting surfaces disposed at various angles to the plane of said sheet of light transmitting material, an opaque figure in the representation of an inclosed structure provided with openings spaced from said light reflecting surface in a manner to produce with the image of the figure on said reflecting surface the illusion of perspective, and a source of light located substantially between the planes of said reflecting surface and said figure and adapted to produce the effect of illumination within the structure.

6. In a device of the character described, the combination of a panel of light transmitting material having a light reflecting surface adapted to diffuse the rays of light transmitted through said light transmitting medium, an opaque figure in the representation of an inclosed structure spaced from said reflecting surface, a source of artificial light located remotely from said figure, its rays being transmitted through said light transmitting medium to said figure to produce the effect of illumination within the structure.

7. In a device of the character described, the combination of a panel having a light reflecting surface, an opaque figure in the representation of an inclosed structure provided with openings and spaced from said panel, said figure and its image producing the illusion of the structure in perspective, and a source of artificial light located between the planes of said figure and reflecting surface, said source of light producing the effect of illumination within the structure, and of concentrated rays issuing from said structure.

8. In a device of the character described, the combination of a panel having a light reflecting surface, an opaque figure in the representation of a closed structure spaced from said light reflecting surface, the image of said figure in said reflecting surface producing the illusion of perspective, a source of artificial light located remotely from the opaque figure, and adapted to produce the effect of illumination within the structure, and a source of light located behind the opaque figure and adapted to produce the effect of concentrated rays issuing from the structure.

In witness whereof, I hereunto subscribe my name this 9th day of October, A. D., 1919.

DAVID B. CARSE.